United States Patent Office 3,092,637
Patented June 4, 1963

3,092,637
PROCESS FOR THE PREPARATION OF ACETALS AND KETALS OF N,N-DISUBSTITUTED CARBOXAMIDES
Morton Brown, Wilmington, Del., assignor to E. I. du Pont de Nemours and Company, Wilmington, Del., a corporation of Delaware
No Drawing. Filed Feb. 27, 1961, Ser. No. 91,571
20 Claims. (Cl. 260—326.5)

This invention relates to, and has as its principal object provision of, a new process for the preparation of acetals and ketals of N,N-disubstituted carboxamides, i.e., the preparation of α,α-dihydrocarbonoxy-substituted tertiary amines.

Until quite recently, the amide acetals and ketals represented a new class of compounds. Meerwein, Angew. Chem. 71, 530 (1959), first announced the synthesis of this class of quite versatile, highly reactive intermediates. Their reactivity may be exemplified by the facts that they quickly hydrolyze to the corresponding amide, easily undergo exchange reactions upon simple heating with higher boiling alcohols and phenols to form the corresponding higher acetals and ketals, and, more importantly, condense without any catalyst with compounds containing a labile methyl or methylene group to form the corresponding substituted ethylene, e.g., malononitrile in reaction with the diethyl acetal of N,N-dimethylformamide readily forms in good yields the highly interesting substituted ethylene, 2,2-dicyano-1-dimethylaminoethylene.

While Meerwein's work was important in providing this new class of reactive chemical intermediates, the process conditions taught for the synthesis thereof leave much to be desired, particularly from the standpoint of commercial significance and especially with cost considerations in mind. Thus, the reaction sequence is a threefold one involving first condensation between a hydrocarbon ether, e.g., diethyl ether, a hydrocarbon fluoride, e.g., ethyl fluoride, and silver fluoborate to form a trihydrocarbonoxonium fluorborate, e.g., triethoxonium fluoborate, and silver fluoride. The thus formed oxonium fluoborate is then reacted with the requisite N,N-dihydrocarbon-substituted carboxamide, e.g., N,N-dimethylformamide, to form the intermediate oxonium fluoborate derivative of the amide, which may also be described as an α-(N,N-dihydrocarbonamino) - α - (hydrocarbonoxy)hydrocarbonium fluoborate. This is subsequently further reacted with a molar proportion of the desired alkali metal alcoholate to form the desired amide acetal or ketal and the alkali metal fluoborate, all in accord with the following stoichiometry:

R₂O + RF + AgBF₄ ⟶ R₃O⁺BF₄⁻ + AgF

R₃O⁺BF₄⁻ + R′CONR₂″ ⟶ R₂″NC̈R′(OR)BF₄⁻ + R₂O

R₂″NC̈R′(OR)BF₄⁻ + NaOR‴ ⟶
R₂″NCR′(OR)(OR‴) + NaBF₄

It has now been found that the desired amide acetals and ketals can be formed directly in one step by reaction between an alkali metal or alkaline earth metal salt of the desired alcohol or phenol with the requisite 1,1-dihalosubstituted tertiary amine in accord with the following stoichiometry:

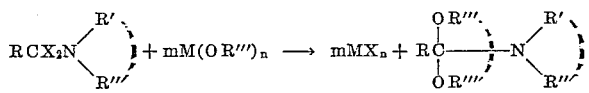

wherein R′ and R″, which can be alike or different, represent monovalent alkyl or cycloalkyl hydrocarbon radicals of generally no more than eight carbons each, both of which can be together joined with the intervening nitrogen to form therewith a saturated heterocycle of from three to seven ring members (possible joinder being indicated by the broken lines); R is hydrogen or a monovalent alkyl, aryl, aralkyl, alkaryl, or cycloalkyl hydrocarbon radical of generally no more than eight carbons or

the X's, which can be alike or different, are halogens of atomic number from 9 to 35, inclusive; M is an alkali metal or alkaline earth metal, i.e., a metal of atomic number from 3 to 56 of groups I–A and II–A of the periodic table, inclusive; R‴ is a monovalent alkyl, aryl, alkaryl, aralkyl, or cycloalkyl radical of generally no more than eight carbons; m and n are integers from 1 to 2, inclusive, depending on the valence of the metal M and such that m+n=3. When n is 2, the R‴'s can be together joined to form in the products with intervening carbon and two oxygens a 1,3-dioxocarbocycle of 5 to 7 ring members and in the intermediates an alkylene carbon chain of 2 to 4 units.

The reaction is a simple one and proceeds directly, generally at low to modest temperatures, depending on the relative reactivity of the coreactants involved. The necessary 1,1-dihalosubstituted basic tertiary amines can be readily obtained by direct halogenation of the requisite N,N-disubstituted amide with the desired halogenating agent, such as carbonyl fluoride, thionyl chloride, phosgene, sulfur tetrafluoride, and the like—see, for instance, Bosshard et al., Helv. Chim. Acta. 42, 1653 (1959), U.S. Patent 2,859,245, and the copending coassigned application of Ellingboe et al., Serial No. 852,939, filed Nov. 16, 1959. It may be noted that it is not always requisite that the substituted tertiary amine or alcohol or phenol salt be separated from the environment in which it is formed before further reaction with its coreactant, i.e., either reactant may be formed in situ (see Examples VI and VII below).

Generally speaking, the 1,1-dichloro- and 1,1-dibromo-substituted basic tertiary amine coreactants will be solids and will normally require the use of a nonreactive hydrocarbon, cyclic hydrocarbon, or such hydrocarbon ether solvent, such as the hydrocarbon aliphatic ethers, e.g., diethyl ether, di-n-propyl ether, and the like, as well as the cyclic hydrocarbon ethers, e.g., tetrahydrofuran and the like. The 1,1-difluorosubstituted basic tertiary amines, particularly in the lower carbon content range, are liquids, and, accordingly, the use thereof is preferred because of better solubility characteristics and frequently more convenient handling techniques. The same types of solvents can be used with the 1,1-difluoroamines, or in the case of the first few members of the series, no solvent need be used at all. Generally, however, even in these instances, for promoting better conductivity of the exothermic reaction heat, a solvent will normally be used.

The reaction is generally carried out under anhydrous, and desirably also oxygen-free, conditions in a closed glass reactor, preferably at low temperature with external cooling means supplied to remove the exothermic reaction heat as it is formed. Normally the reaction will be carried out in the temperature range from approximately —20° C. to generally no higher than about 60–100° C. The alkali metal halide or alkaline earth metal halide, depending on the coreactants involved, will precipitate out as it is formed and at the end of the reaction is removed by simple filtration. The reaction solvent, if one is present as is usually the case, will then simply be removed by distillation, if desired, at reduced pressure, although this generally will not be preferred. The disubstituted amide acetal or ketal product will then be purified by direct distillation, and for the longer chain carbon compounds, this will generally be carried out at reduced pressure.

The following examples, in which the parts given are by weight, are submitted to further illustrate but not to limit the present generic process invention.

*Example I*

A corrosion-resistant pressure vessel of internal capacity corresponding to 500 parts of water was charged with 146 parts of N,N-dimethylformamide and 33 parts (0.25 molar proportion based on the formamide) of carbonyl fluoride. The reaction mixture was let stand under autogenous pressure at 25° C. for 21 hours. The reactor was then vented to the atmosphere and the reaction mixture removed. Fractional distillation afforded 30 parts (63% of theory) of 1,1-difluorotrimethylamine as a colorless, fuming liquid boiling at 47–51.5° C. The nuclear magnetic resonance spectrum was wholly consistent with the difluorotrimethylamine structure showing two different kinds of hydrogen in a 6:1 ratio of intensities, with the smaller peak being a triplet, and only one type of fluorine and that a doublet. The product was still further characterized as 1,1-difluorotrimethylamine by mass spectrometer analysis and also through its infrared spectrum.

*Anal.*—Calcd. for $C_3H_7F_2N$: F, 40.0%; N, 14.7%. Found: F, 39.4%; N, 15.4%.

In a spherical glass reactor fitted with a thermometer, a mechanical stirrer, and a dropping funnel of internal capacity corresponding to 3,000 parts of water was placed a mixture of 486 parts of freshly opened commercial sodium methoxide and 1500 parts of anhydrous diethyl ether. The reaction mixture was protected with a blanket of dry nitrogen while it was cooled to 0° C. by application of an external ice/water/salt bath. Approximately an 0.5 molar proportion charge (410 parts) of freshly distilled 1,1-difluorotrimethylamine, i.e., N-difluoromethyl-N,N-dimethylamine, was added dropwise with stirring over a period of one hour while maintaining the reaction mixture at between 0 and 10° C. still under an anhydrous nitrogen atmosphere. After the addition was completed, the mixture was let stand at room temperature with stirring for a period of one hour. The solid sodium fluoride was then removed by filtration, and the diethyl ether solvent removed from the filtrate by distillation at atmospheric pressure. Continued distillation of the residue through a precision fractionation column afforded 374 parts (73% of theory) of dimethylformamide dimethyl acetal, i.e., dimethoxytrimethylamine, i.e., N-dimethoxymethyl-N,N-dimethylamine, as a clear, colorless liquid boiling at 101–102° C. at atmospheric pressure; $n_D^{25}$, 1.3957.

*Anal.*—Calcd. for $C_5H_{13}NO_2$: C, 50.4%; H, 11.0%; N, 11.8%. Found: C, 50.4%; H, 10.9%; N, 11.8%.

*Example II*

Example I was substantially repeated using 19 parts of 1,1-difluorotrimethylamine and 29.9 parts of sodium ethylate. After precision distillation, there was thus obtained 17 parts (58% of theory) of the diethyl acetal of N,N-dimethylformamide, i.e., 1,1-diethoxytrimethylamine, as a clear, colorless liquid boiling at 131.0–132.5° C. at atmospheric pressure; $n_D^{25}$, 1.4010.

*Anal.*—Calcd. for $C_7H_{17}NO_2$: C, 57.1%; H, 11.6%; N, 9.5%. Found: C, 57.0%; H, 11.5%; N, 9.6%.

*Example III*

As in Example I to a mixture of 10.2 parts of freshly opened commercial sodium methoxide and 133 parts of anhydrous tetrahydrofuran under nitrogen was added dropwise with stirring over a period of one hour 15 parts (about 0.465 molar on methoxide) of 1,1-difluorobenzyldimethylamine, i.e., 1,1-difluoro-1-phenyltrimethylamine (see U.S. 2,859,245), in 26.6 parts of anhydrous tetrahydrofuran while maintaining the reaction mixture at between 20 and 30° C. by application of an external water bath as needed. After the addition was completed, the mixture was refluxed with stirring for one hour. The solid sodium fluoride was then removed by filtration and the tetrahydrofuran solvent removed from the filtrate by distillation at reduced pressure. Continued distillation of the residue through a precision fractionation column afforded 7.85 parts (60% of theory) of the dimethyl acetal of N,N-dimethylbenzamide, i.e., 1,1-dimethoxybenzyldimethylamine, or 1,1-dimethoxy-1-phenyltrimethylamine, as a clear, colorless liquid boiling at 65–68° C. under a pressure corresponding to 5 mm. of mercury; $n_D^{25}$, 1.5045.

*Anal.*—Calcd. for $C_{11}H_{17}NO_2$: C, 67.6%; H, 8.8%. Found: C, 67.4%; H, 8.7%.

*Example IV*

A corrosion-resistant pressure vessel (internal capacity corresponding to 500 parts of water) was charged with a mixture of 44 parts of N,N,N',N'-tetramethylurea and 30 parts (about 1.15 molar proportions based on the urea) of carbonyl fluoride. The reactor and its contents were then heated under autogenous pressure at 50° C. for one hour and then at 75° C. for an additional hour. The reactor was then cooled to room temperature, vented to the atmosphere, and the reaction mixture removed. On precision fractionation of the product, there was obtained five parts of N,N,N',N'-tetramethyldifluoromethylenediamine, i.e., bis(dimethylamino)difluoromethane, as a clear, colorless liquid boiling at 101–103° C. at atmospheric pressure. The nuclear magnetic resonance spectrum was wholly consistent with the tetramethyldifluoromethylenediamine structure showing only one type of fluorine and that a singlet, and only one type of hydrogen and that a singlet. The product was still further characterized as tetramethyldifluoromethylenediamine through the infrared spectrum thereof.

*Anal.*—Calcd. for $C_5H_{12}N_2F_2$: F, 27.5%. Found: F, 26.8%; 27.1%.

Example I was substantially duplicated using 32.4 parts of sodium methylate and 27.6 parts of N,N,N',N'-tetramethyldifluoromethylenediamine, i.e., bis(dimethylamino)difluoromethane (see the above-mentioned copending application of Ellingboe et al.). After precision distillation, there was thus obtained 25.9 parts (80% of theory) of N,N,N',N' - tetramethyldimethoxymethylenediamine, i.e., bis(dimethylamino)dimethoxymethane, as a clear, colorless liquid boiling at 69–70° C. under a pressure corresponding to 44 mm. of mercury; $n_D^{25}$, 1.4242.

*Anal.*—Calcd. for $C_7H_{18}N_2O_2$: C, 51.8%; H, 11.2%; N, 17.3%. Found: C, 52.0%; H, 11.0%; N, 16.8%.

*Example V*

In the manner of Bosshard et al., Helv. Chim. Acta, 42, 1653 (1959), 30 parts of dimethylacetamide was treated with phosgene at 0° C. The resultant corrosive, water-sensitive, solid 1,1-dichloroethyldimethylamine was slurried with 355 parts of anhydrous tetrahydrofuran in a glass reactor equipped with a mechanical stirrer, a thermometer, and means for adding anhydrous sodium methoxide at a controlled rate and protected from the atmosphere by calcium chloride tubes. The slurry was cooled with stirring by application of an external ice/water/salt bath until the reaction mixture was at a temperature of 0–10° C. and 38 parts (two molar proportions based on the starting dimethylacetamide) of sodium methoxide was added gradually with rapid stirring while maintaining the reaction in this same temperature range. The reaction was vigorously exothermic. When the addition was completed, stirring was continued at room temperature for one hour. The slurry was then filtered to remove the by-product sodium chloride, and the filtrate purified by distillation through a precision fractionation column. After removal of the tetrahydrofuran solvent, continued distillation afforded 21.6 parts (47% of theory) of dimethylacetamide dimethyl ketal, i.e., 1,1-dimethoxyethyldimethylamine, as a clear, colorless liquid boiling at 118–120° C. at atmospheric pressure; $n_D^{25}$, 1.4047–1.4052.

*Anal.*—Calcd. for $C_6H_{15}NO_2$: C, 53.3%; H, 11.2%; N, 10.4%. Found: C, 53.0%; H, 11.3%; N, 10.6%.

Example VI

To a cooled (−20° C.), stirred solution of 73 parts of N-formylpyrrolidine and 280 parts of anhydrous diethyl ether was added dropwise over a period of 1.75 hours 100 parts (1.08 molar proportions based on the pyrrolidine) of oxalyl chloride while maintaining the reaction temperature by external application of a cooling bath. Evolution of carbon monoxide and carbon dioxide was brisk. When the addition was complete, the reaction mixture was permitted to warm to room temperature and allowed to stand under anhydrous conditions overnight. Additional anhydrous diethyl ether (about 100 parts) was added to make the mixture more fluid, and 86.4 parts of sodium methoxide was added portionwise with stirring at such a rate as to maintain the reaction mixture in a 20–30° C. range. When the exothermic reaction subsided, the reaction mixture was again allowed to stand overnight at room temperature under anhydrous conditions. The solid sodium chloride by-product was then removed by filtration under dry nitrogen through a bed of a commercially available silica filter aid. The diethyl ether solvent was distilled from the filtrate, and on continued distillation of the residue through a precision fractionation column, there was obtained 15.6 parts (21% of theory) of recovered N-formylpyrrolidine and 49.2 parts (46% of theory) of the desired dimethyl acetal of N-formylpyrrolidine, i.e. dimethoxy-N-pyrrolidinomethane, i.e., N-dimethoxymethylpyrrolidine, as a clear, colorless liquid boiling at 67–69° C. under a pressure corresponding to 26 mm. of mercury; $n_D^{25}$, 1.4350.

*Anal.*—Calcd. for $C_7H_{15}NO_2$: C, 57.9%; H, 10.4%; N, 9.6%. Found: C, 58.1%; H, 10.4%; N, 9.6%.

Example VII

To a stirred suspension of 9.6 parts of 50% sodium hydride in mineral oil and 150 parts of anhydrous diethyl ether was added dropwise over a period of one-half hour with stirring and external cooling with an ice/water bath a solution of 10.4 parts of neopentyl glycol in 10 parts of anhydrous tetrahydrofuran. The reaction mixture was then heated at the reflux for a half-hour and was then cooled to 0–5° C. A solution of 10 parts of freshly distilled 1,1-difluorotrimethylamine in 20 parts of anhydrous diethyl ether was added dropwise with stirring over a period of one-half hour, keeping the reaction temperature below 20° C. by adjusting the rate of the addition and using external cooling. The reaction mixture was then stirred for half an hour at room temperature and the by-product sodium fluoride was then removed by filtration. The filtrate was concentrated by evaporative distillation under a pressure corresponding to 10 mm. of mercury to remove the solvents. Fractionation of the liquid residue through a precision distillation column afforded 9.2 parts (58% of theory) of 2-dimethylamino-5,5-dimethyl-1,3-dioxane as a clear, colorless liquid boiling at 178–180° C. at atmospheric pressure; $n_D^{25}$, 1.4348. The product can also be described as the cyclic 2,2-dimethyl-1,3-trimethylene acetal of N,N-dimethylformamide.

*Anal.*—Calcd. for $C_8H_{17}NO_2$: C, 60.2%; H, 10.8%; N, 8.8%. Found: C, 60.1%; H, 10.8%; N, 8.2%.

Example VIII

A mixture of 25 parts of N-cyclohexyl-N-methylformamide, 100 parts of methylene chloride, and 35 parts of carbonyl fluoride was heated under autogenous pressure for eight hours at 50° C. and then for two hours at 100° C. in a corrosion-resistant pressure vessel of internal capacity corresponding to 400 parts of water. The bomb was cooled, vented to the atmosphere, and the volatile materials flash-distilled into a solid carbon dioxide/acetone trap under a pressure corresponding to 1–2 mm. of mercury. Upon precision redistillation of the distillate, there was obtained 17.3 parts (60% of theory) of cyclohexylmethyldifluoromethylamine as a clear, colorless liquid boiling at 65–68° C. under a pressure corresponding to 23 mm. of mercury.

*Anal.*—Calcd. for $C_8H_{15}NF_2$: C, 58.8%; H, 9.2%; F, 23.3%. Found: C, 58.6%; H, 9.1%; F, 23.0%. Example I was substantially repeated using 16.3 parts of the above cyclohexylmethyl-1,1-difluoromethylamine, 13 parts of sodium methylate, and 100 parts of tetrahydrofuran instead of the diethyl ether solvent. Upon distillation of the residue remaining after the removal of the sodium fluoride precipitate, there was obtained 11.2 parts (70% of theory) of the dimethyl acetal of N-cyclohexyl-N-methylformamide, i.e., cyclohexylmethyl-1,1-dimethoxymethylamine, as a clear, colorless liquid boiling at 115–116° C. under a pressure corresponding to 24 mm. of mercury; $n_D^{25}$, 1.4378.

*Anal.*—Calcd. for $C_{10}H_{21}NO_2$: C, 69.3%; H, 12.2%; N, 18.5%. Found: C, 69.3%; H, 12.1%; N, 18.3%.

While the foregoing examples illustrate the process of this invention, for the preparation of amide acetals and ketals using substantially pure, i.e., alcohol-free, alkoxides, the process can be fully operated with the alkoxide in solution or suspension in the corresponding alcohol. Thus:

Example IX

A spherical glass reactor of internal capacity corresponding to 1000 parts of water and fitted with stirring means, a reflux water condenser, and a dropping funnel and protected from atmospheric moisture was charged with a solution of 54 parts of sodium methoxide and about 160 parts of absolute methanol. The charge was cooled to 0° C. by application of an external ice/water bath, and 47.5 parts of freshly distilled 1,1-difluorotrimethylamine was added with rapid stirring over a period of one hour, maintaining the temperature of the reaction mixture between 0 and 25° C. At the end of the addition, about 70 parts of anhydrous diethyl ether was added to increase the fluidity of the reaction mixture. Stirring was continued for an additional hour at 25° C. A commercial filtering aid was then added and the solid sodium fluoride by-product removed from the resultant mixture under nitrogen. The solvents were removed from the filtrate by distillation, and upon continued distillation of the resultant filtrate through a precision fractionation column there was thus obtained 13.3 parts (22% of theory) of the dimethyl acetal of dimethylformamide, i.e., 1,1-dimethoxytrimethylamine, as a clear, colorless liquid boiling at 103° C. at atmospheric pressure—see Example I.

In addition to the foregoing detailed specific disclosures of the various 1,1-dihalotertiary amines and alkali metal or alkaline earth metal alkoxide intermediates for use in the preparation of the amide acetals by the process of the present invention, there can be used various other such intermediates. These useful 1,1-dihalosubstituted tertiary amines include both acyclic and cyclic, with the latter term being inclusive of heterocyclic such structures. Generically, for reasons of improved reactivity with lack of complicating side reactions, the operable 1,1-dihalosubstituted tertiary amine intermediates will be aliphatically saturated, i.e., free of non-aromatic carbon-carbon unsaturation. Suitable specific additional operable 1,1-dihalosubstituted tertiary amine intermediates include 1-difluoromethylazetidine, 4-dichloromethylmorpholine, 1,1-dichloro-n-butyldimethylamine, 2,2-dichloro-1-methyl perhydroazepine, 1-dichloromethylperhydroazine, i.e., 1-dichloromethylhexahydropyridine; cyclopentylmethyl-dichloromethylamine, 1,1-dibromo-2-phenylethyldimethylamine, and the like.

Similarly, additional useful alkali metal or alkaline earth metal alcoholates or phenolates as coreactants with the just-described 1,1-dihalosubstituted tertiary amines include again both acyclic and cyclic such structures. Suitable specific compounds include the sodium salt of n-octyl alcohol, the potassium salt of cyclohexanol, calcium methylate, lithium n-butylate, calcium n-octanoate, potassium methylate, sodium phenylate, and the like.

Using the aforesaid, just-enumerated, useful 1,1-dihalosubstituted tertiary amines and alkali and alkaline earth metal alcoholates and phenolates taken, respectively, in order pairwise under the conditions previously set out for the process of the present invention, there will be obtained the following specific amide acetals and ketals: 1-di-n-octyloxymethylazetidine, i.e., the di-n-octyl acetal of 1-formylazetidine; 4-dicyclohexyloxymethylmorpholine or dicyclohexyloxy-4-morpholino-methane, also describable as the dicyclohexyl acetal of 4-formylmorpholine; 1,1-dimethoxy-n-butyldimethylamine, i.e., the dimethyl acetal of N,N-dimethyl-n-butyramide; 2,2-di-n-butoxy-1-methylperhydroazepine; 1-di-n-octyloxymethylperhydroazine, i.e., 1-di-n-octyloxymethylhexahydropyridine; cyclopentylmethyl-1,1-dimethoxymethylamine, i.e., the dimethyl acetal of N-cyclopentyl-N-methylformamide; 1,1-diphenoxy-2-phenylethyldimethylamine, i.e., the diphenyl acetal of N,N-dimethyl-2-phenylacetamide; and the like.

In addition to the usefulness of the amide acetals and ketals prepared by the new process of this invention as reactive chemical intermediates, all as outlined in the foregoing, they are generically useful as scavengers for water or other active hydrogen-containing materials, such as hydrogen sulfide, hydrocyanic acid, and the like, particularly in organic systems in which their good organic solubility makes them especially useful. They are particularly outstanding in such uses because, unlike other organic-soluble scavengers for such materials, the products obtained after the scavenging action, i.e., the removal from the system of the unwanted active hydrogen-containing component, are non-corrosive and, in general, harmless to the uses for which the scavenged systems are envisaged.

Since obvious modifications and equivalents in the invention will be evident to those skilled in the chemical arts, I propose to be bound solely by the appended claims.

The embodiments of the invention in which an exclusive property or privilege is claimed are defined as follows:

1. A process which comprises reacting together, in liquid phase, (1) a compound of the group consisting of MOR³ and M'(OR⁴)₂, wherein: M is an alkali metal; M' is an alkaline earth metal; R³ is selected from the group consisting of monovalent alkyl, aryl, alkaryl, aralkyl and cycloalkyl hydrocarbon of up to 8 carbons; and the R⁴'s are selected from the group consisting, individually, of monovalent alkyl, aryl, alkaryl, aralkyl and cycloalkyl hydrocarbon of up to 8 carbons and, jointly, of divalent alkylene of 2–4 carbons; and (2) a N,N-dihalo tertiary amine of the formula

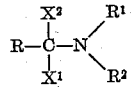

wherein: X¹ and X² are halogen of atomic number 9–35; R¹ and R² are selected from the group consisting, individually, of alkyl and cycloalkyl of up to 8 carbons and, jointly, of alkylene of 2–6 carbons; and R is selected from the group consisting of hydrogen, monovalent alkyl, aryl, aralkyl, alkaryl and cycloalkyl hydrocarbon of up to 8 carbons and

R¹ and R² being as above.

2. The process of claim 1 accomplished in an inert liquid organic reaction medium.

3. The process of claim 2 wherein at least one reactant is formed in situ.

4. The process of claim 1 accomplished in a liquid alcohol.

5. The process which comprises reacting together, in liquid phase, an alkali metal alkoxide and N-difluoromethyl-N,N-dimethylamine.

6. The process of claim 5 accomplished in a liquid organic reaction medium.

7. The process which comprises reacting together, in a liquid ether, an alkali metal methoxide and N-difluoromethyl-N,N-dimethylamine.

8. The process which comprises reacting together, in an inert liquid organic reaction medium, an alkali metal alkoxide and 1,1-difluoro-1-phenyltrimethylamine.

9. The process of claim 8 wherein the inert liquid organic reaction medium is an ether and the alkoxide is a methoxide.

10. The process which comprises reacting together, in liquid phase, an alkali metal alkoxide and bis(dimethylamino)difluoromethane.

11. The process of claim 10 accomplished in an inert liquid organic reaction medium.

12. The process which comprises reacting together, in a liquid ether, an alkali metal methoxide and bis(dimethylamino)difluoromethane.

13. The process which comprises reacting together, in an inert liquid organic reaction medium, an alkali metal alkoxide and 1,1-dichloroethyldimethylamine.

14. The process of claim 13 wherein the inert liquid organic reaction medium is an ether and the alkoxide is an methoxide.

15. The process of sequentially reacting, in an inert organic reaction medium, (1) N-formylpyrrolidine with oxalyl chloride and (2) then, in situ, with an alkali metal alkoxide.

16. The process of claim 15 in which the alkali metal alkoxide is sodium methoxide.

17. The process of sequentially reacting, in an inert organic reaction medium, (1) neopentyl glycol with an alkali metal hydride and (2) then, in situ, with 1,1-difluorotrimethylamine.

18. The process which comprises reacting together, in liquid phase, an alkali metal alkoxide and cyclohexylmethyldifluoromethylamine.

19. The process of claim 18 accomplished in an inert liquid organic reaction medium.

20. The process which comprises reacting together, in a liquid ether, an alkali metal alkoxide and cyclohexylmethyldifluoromethylamine.

No references cited.